United States Patent

Bouttefort et al.

[11] Patent Number: 5,922,805
[45] Date of Patent: Jul. 13, 1999

[54] POLYURETHANE-BASED SINGLE-COMPONENT HOT-MELT ADHESIVES WITH IMPROVED INITIAL COHESION

[75] Inventors: Patrick Bouttefort, Margny les Compiegne; Michel Miskovic, Compiegne; Gerard Guilpain, Rueil Malmaison, all of France

[73] Assignee: ATO Findley S.A., France

[21] Appl. No.: 08/893,099

[22] Filed: Jul. 15, 1997

[30] Foreign Application Priority Data

Jul. 16, 1996 [FR] France .................................. 96 08876

[51] Int. Cl.$^6$ .............................. C08J 3/00; C08K 3/20; C08L 75/00; B31B 1/60
[52] U.S. Cl. ............................ 524/590; 156/60; 156/327; 156/331.4; 156/331.7; 525/123; 525/455
[58] Field of Search .................................. 525/123, 455; 524/590; 156/60, 327, 331.4, 331.7

[56] References Cited

U.S. PATENT DOCUMENTS 5,506,296  4/1996  Chenard et al. ........................... 525/56

FOREIGN PATENT DOCUMENTS

| | | |
|---|---|---|
| 107097 A1 | 5/1984 | European Pat. Off. . |
| 246473 | 11/1987 | European Pat. Off. . |
| 289945 | 11/1988 | European Pat. Off. . |
| 294271 | 12/1988 | European Pat. Off. . |
| 302620 | 2/1989 | European Pat. Off. . |
| 402864 | 12/1990 | European Pat. Off. . |
| 600767 A1 | 6/1994 | European Pat. Off. . |
| 58-217575 | 12/1983 | Japan . |
| WO 91/14727 | 10/1991 | WIPO . |

OTHER PUBLICATIONS

French Search Report dated Mar. 27, 1997.

*Primary Examiner*—Patrick D. Niland
*Attorney, Agent, or Firm*—Bell, Boyd & Lloyd

[57] ABSTRACT

The invention relates to polyurethane-based hot-melt adhesives resulting from the polyaddition of a polyisocyanate, of a polyol and of a copolymer of ethylene, of vinyl acetate and of an ethylenically unsaturated monomer containing at least one primary hydroxyl group per mole. It also relates to a process for the preparation of the said adhesives. It also relates to the use of the adhesives for the adhesive bonding of flexible materials such as films.

10 Claims, No Drawings

POLYURETHANE-BASED SINGLE-COMPONENT HOT-MELT ADHESIVES WITH IMPROVED INITIAL COHESION

FIELD OF THE INVENTION

The present invention relates to polyurethane-based reactive single-component hot-melt adhesives with an improved initial rate of rise in cohesion.

BACKGROUND OF THE INVENTION

In the field of adhesives, polyurethane-based reactive single-component formulations are often employed because of their following advantageous properties:

good mechanical strength of the bonded assembly, adhesion to substrates of various natures, improved resistance to hydrolysis when compared with traditional adhesives, in particular hot-melt adhesives, compatibility with treatments subsequent to the bonding operation (for example painting), good chemical resistance, and good heat strength.

These properties result from the presence of free isocyanate groups in the polyurethane which, after processing, react with moisture and/or the reactive functional groups of the substrates to be assembled, causing a subsequent partial crosslinking.

However, the polyurethane-based formulations which have just been mentioned exhibit, as a major disadvantage, a low rate of rise in cohesion. As a result it is necessary to hold the bonded components for a sufficient time to enable the assembly to be handled, which is found to be prohibitive when the intention is to produce adhesive bondings with machines operating at a high output rate.

Various solutions have been proposed in order to improve the rate of rise in cohesion immediately after the application.

Thus in EP-A-107 097 it has been proposed to add a polyurethane or a thermoplastic crystalline polyester to the hot-melt compositions based on an isocyanate prepolymer and on a synthetic resin of low molecular weight.

Hot-melt adhesives have also been described which include a urethane prepolymer and polymers of low molecular weight (see EP-A-246 473) or a thermoplastic polymer of ethylene and of a vinyl monomer and a tackifying agent (see EP-A-289 945).

In EP-A-402 854 a hot-melt composition is formed by reacting a polyisocyanate and a copolymer of ethylene, of vinyl acetate and of ethylenically unsaturated monomers containing hydroxyl functional groups.

Besides the low rate of rise in cohesion, the adhesives which have just been mentioned exhibit the disadvantage of being applicable only at an elevated temperature (in the case of crystalline polyesters) or of exhibiting a plasticization of the adhesive after crosslinking (in the case of thermoplastic polymers).

DESCRIPTION OF THE INVENTION

New, polyurethane-based hot-melt adhesives have now been found which make it possible to overcome these disadvantages, more particularly in terms of cohesion. The adhesives according to the invention contain a thermoplastic polymer containing hydroxyl groups which are chemically bonded to the isocyanate groups. The said polymer thus forms an integral part of the structure of the polyurethane, which is not the case in the compositions of the prior art, which are obtained merely by mixing polyurethane and thermoplastic polymer.

More precisely, the adhesives according to the invention are characterized in that they are made up of the product of polyaddition of a polyisocyanate, of a polyol and of a copolymer of ethylene, of vinyl acetate and of an ethylenically unsaturated monomer containing at least one primary hydroxyl group per mole.

The polyisocyanate constituting the polyurethane according to the invention is generally chosen from aliphatic, cycloaliphatic or aromatic polyisocyanates which are well known to a person skilled in the art, and mixtures of these compounds.

As examples of aliphatic polyisocyanates there may be mentioned hexamethylene diisocyanate (HMDI), ethylene diisocyanate, ethylidene diisocyanate, propylene diisocyanate, butylene diisocyanate, dichlorohexamethylene diisocyanate, furfurylidene diisocyanate and mixtures of these compounds.

As examples of cycloaliphatic polyisocyanates there may be mentioned isophorone diisocyanate (IPDI), 1,3-cyclopentylene diisocyanate, 1,4-cyclohexylene diisocyanate, 1,2-cyclohexylene diisocyanate and mixtures of these compounds.

As examples of aromatic polyisocyanates there may be mentioned diphenylmethane diisocyanate, especially 4,4'-diphenylmethane diisocyanate (MDI), 2,4'-diphenylmethane diisocyanate and 2,2'-diphenylmethane diisocyanate, toluene diisocyanate, especially 2,4-toluene diisocyanate (TDI) and 2,6-toluene diisocyanate 2,2-diphenylpropane 4,4'-diisocyanate, p-phenylene diisocyanate, m-phenylene diisocyanate, xylene diisocyanate, 1,4-naphthalene diisocyanate, 1,5-naphthylene diisocyanate, azobenzene 4,4'-diisocyanate diphenyl sulphone 4,4'-diisocyanate, 1-chlorobenzene 2,4-diisocyanate, 4,4',4"-triisocyanatotriphenylmethane, 1,3,5-triisocyanatobenzene, 2,4,6-triisocyanatotoluene, 4,4'-dimethyldiphenylmethane 2,2', 5,5'-tetraisocyanate and mixtures of these compounds.

Diisocyanates are preferably employed, and more particularly MDI, 2,4'-diphenylmethane diisocyanate, 2,2'-diphenylmethane diisocyanate, TDI, 2,6-toluene diisocyanate, HMDI and IPDI.

The above polyisocyanates can also be employed as a mixture with one or more monoisocyanates. This makes it possible in particular to control the degree of grafting on the copolymer or to introduce functional groups.

para-Toluenesulphonyl isocyanate or monoisocyanate containing one or more silane groups is preferred.

The monoisocyanate generally represents 0 to 10% by weight of all the constituents of the adhesive.

The polyol constituting the polyurethane according to the invention is generally chosen from polyether polyols, polyester polyols and unsaturated polyols.

The polyether polyols are generally chosen from aliphatic and aromatic polyether polyols and mixtures of these components. Preferably, their mean molecular mass is between 200 and 9000 and their hydroxyl functionality is between 2 and 4.6.

Examples of aliphatic polyether polyols which may be mentioned are oxyalkylated derivatives of diols such as polypropylene glycols or of triols such as glycerol, trimethylolpropane and 1,2,6-hexanetriol, polymers of ethylene, propylene or butylene oxides, copolymers of ethylene oxide and of propylene oxide, the abovementioned compounds with a silanyl end and oxyalkylated derivatives of diphenyls such as diphenylmethane derivatives which are oxyethylenated or oxypropylenated in 4,4' position.

Oxypropylated derivatives of glycerol, polymers of propylene or butylene oxide and copolymers of ethylene oxide and of propylene oxide are preferably employed.

The polyester polyols are generally chosen from aliphatic and aromatic polyester polyols and mixtures of these compounds. Preferably, their mean molecular mass is between 250 and 7000 and their hydroxyl functionality is between 2 and 3.

By way of examples there may be mentioned polyester polyols resulting from the condensation of aliphatic, cyclic or aromatic polyols such as ethylene glycol, propylene glycol, glycerol, trimethylolpropane, 1,6-hexanediol, 1,2,6-hexanetriol, butenediol, sucrose, glucose, sorbitol, pentaerythritol, mannitol, triethanolamine and N-methyldimethanolamine with an acid such as 1,6-hexanedioic acid, dodecanedioic acid, azelaic acid, sebacic acid, adipic acid, 1,18-octa-decanedioic acid, phthalic acid, succinic acid, an unsaturated anhydride such as maleic or phthalic anhydride, or a lactone such as caprolactone.

Polyester polyols resulting from the condensation of ethylene glycol, 1,6-hexanediol or trimethylolpropane with adipic or phthalic acid are preferably employed and, advantageously, as a mixture with a caprolactone-based polyester polyol.

The unsaturated polyols are generally chosen from the polyols and mixtures of polyols which preferably have a molecular mass of between 1200 and 3000 and the mixtures of these compounds.

Polybutadiene and polyisoprene with hydroxyl ends may be mentioned by way of examples.

The abovementioned polyols can also be employed as a mixture with other hydroxy compounds.

It is thus possible to employ a monool or a mixture of monools, in particular poly(ethylene/butylene)monools. such as the Kraton Liquid™ L-1203 Polymer, marketed by Shell, or a polyol or a mixture of polyols chosen from poly(ethylene/butylene)diols such as Kraton Liquid™ Polymer HPVM-2203, marketed by Shell, phenol-modified indene/coumarone resins, for example Novares CA120, marketed by VFT, and hydroxylated tackifying resins, for example Reagem, marketed by DRT.

The abovementioned monool and polyol represent, respectively, 0 to 10% and 0 to 25% by weight of the adhesive.

The copolymer constituting the polyurethane according to the invention is chosen from the copolymers of ethylene, vinyl acetate and of an ethylenically unsaturated monomer containing at least one primary hydroxyl group which have a melt index at 190° C. of between 100 and 1000.

The said copolymer preferably includes:
1) 5 to 100 meq. OH of an ethylenically unsaturated monomer containing at least one hydroxyl group per mole,
2) 60 to 90% by weight of ethylene,
3) 10 to 40% by weight of vinyl acetate. The percentage being calculated relative to the total weight of ethylene and vinyl acetate The said copolymer advantageously includes:
1) 10 to 50 m eq. OH of an ethylenically unsaturated monomer containing at least one hydroxyl group per mole,
2) 65 to 80% by weight of ethylene,
3) 20 to 35% by weight of vinyl acetate.
The percentage being calculated relative to the total weight of ethylene and vinyl acetate The said polymer advantageously has a melt index at 190° C. of between 400 and 800.

The hydroxyl-containing monomer copolymerized with ethylene and vinyl acetate advantageously has the formula:

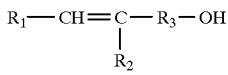

in which:
$R_1$ denotes H or a $C_1$–$C_8$ hydrocarbon radical,
$R_2$ denotes H or a $C_1$–$C_4$ hydrocarbon radical,
$R_3$ denotes CO—O—$(CH_2)_x$, x being between 1 and 5, or $(CH_2)_n$, n being between 0 and 10 inclusive.

By way of example of these monomers there may be mentioned allyl alcohol, oleyl alcohol, vinyl alcohol, 2-hydroxyethyl methacrylate and 2-hydroxyethyl acrylate. 2-Hydroxyethyl methacrylate or acrylate is preferably employed.

The term "meq. OH" means "milliequivalent of OH", that is to say the number of millimoles of hydroxyl (OH) functional group per 100 g of copolymer.

The preparation of the polyurethane according to the invention is carried out by polyaddition of the polyisocyanate, the polyol and the copolymer.

The polyaddition may be carried out according to three alternative ways.

In a preferred first alternative form a two-stage process is employed, which consists in reacting the polyisocyanate with the polyol to form a prepolymer, which prepolymer subsequently reacts in a second stage with the copolymer to form the polyurethane according to the invention.

In a second alternative form the polyisocyanate and the polyol are reacted to form a prepolymer, which subsequently reacts in a second stage with a mixture of the copolymer and of a polyol to form the polyurethane according to the invention.

In a third alternative form the polyurethane is prepared according to a single-stage process which consists in reacting the polyisocyanate, the polyol and the copolymer, it being possible for the two latter constituents to be used simultaneously or in succession.

For the preparation of the polyurethane the copolymer content is generally between 1 and 49%, preferably S and 30%, by weight relative to all the constituents, this being regardless of the alternative form employed.

The charge of polyol and of copolymer which is employed is generally calculated so that, after the polyaddition according to any one of the abovementioned alternative forms, 1 to 25% by weight, preferably 2 to 10%, of free isocyanate functional groups still remain in the polyurethane of the invention.

The polyaddition can, if appropriate, be implemented in the presence of catalysts well known to a person skilled in the art.

The polyurethane adhesives according to the invention may additionally contain:

EXAMPLES up to 50% by weight of compounds containing one or several isocyanate groups, such as monoisocyanates, in particular para-toluenesulphonyl isocyanate or a monoisocyanate containing one or several silane groups, or prepolymers with isocyanate ends, wich may contain a copolymer of ethylene, of vinyl acetate and of an ethylenically unsaturated monomer containing at least one hydroxyl group, catalysts of crosslinking, such as stannous or stannic derivatives, for example dibutyltin dilaurate, trialkylamines, heterocyclic amines, for example 2,2'-dimorpholinoethyl ether (DMDEE), 1,8-diazabicyclo [5.4.0]undec-7-ene (DBU), 1,4-dimethylpiperazine or triethylenediamine, and aliphatic amines, stabilizers such as antioxidants or anti-UV agents, waxes, tackifying resins such as rosin, thermoplastic polymers such as ethylene/vinyl acetate copolymers, acrylic polymers or polymers based on polycaprolactone, fillers, for example ballotini.

The polyurethanes according to the invention are characterized by an improved initial rate of rise in cohesion, an excellent temperature resistance after spontaneous post-crosslinking due to the action of the ambient moisture on the free NCOs and a particularly advantageous flexibility of the adhesive bonding, especially for the adhesive bonding of flexible or rigid materials such as flexible packaging, especially based on plastic films or textiles, sponges, boards, especially for the building trade, constant-temperature vehicle bodies and household electrical appliances.

As a result of the abovementioned advantages the adhesives according to the invention are particualrly suitable for bondings carried out on machines operating at a high output rate, for example for the bonding of materials in film form.

The examples which follow allow the invention to be illustrated.

In these examples reference is made to measurements of melt index and of isocyanate content.

The melt index is measured at 190° C., under 2.16 kg, according to ASTM standard D 1238 70, and is expressed in g/10 minutes.

The free isocyanate content is measured according to AFNOR standard T 52132, and expressed in grams of NCO per 100 grams of adhesive.

Example 1 (Comparative)

Into a reactor maintained under nitrogen atmosphere are introduced 38 parts by weight of 4,4'-diphenylmethane diisocyanate (MDI), 2 parts by weight of polyether triol of the propylated glycerine type (molecular mass=450; functionality=3; Voranol CP 455, marketed by Dow Chemicals) and 7 parts by weight of polyether diol of the propylene oxide type (molecular mass=400; functionality=2; Voranol P 400, marketed by Dow Chemicals).

The temperature in the reactor is raised to 60–65° C. and after the reaction has been completed (stable NCO content), 24 parts by weight of polyether diol of the ethylene-propylene copolymer type (molecular mass=3800; functionality=2; Voranol EP 1900, marketed by Dow Chemicals) and 29 parts by weight of polyetherdiol of the propylene oxide polymer type (molecular mass=400; functionality=2; Voranol P400, marketed by Dow Chemicals) are introduced.

The reaction is stopped when the free isocyanate content of the prepolymer is equal to 4.5%.

The prepolymer obtained is solid at a temperature of the order of 25° C., translucent and slightly yellow. When melted at 100° C, this prepolymer additionally exhibits a high adhesiveness and a Brookfield viscosity equal to 2600 mPa s.

Example 2

83 parts by weight of the prepolymer according to Example 1 are mixed at 100° C. with 17 parts by weight of an ethylene/vinyl acetate/hydroxyethyl acrylate terpolymer (65.7% of ethylene, 32% of vinyl acetate, 2.3π of hydroxyethyl acrylate; melt index=460).

The isocyanate prepolymer obtained has the following properties:

NCO content: 3.7%

Viscosity at 100° C.: 10 000 mPa s

Example 3

The procedure follows the conditions of Example 2, amended in that 75 parts by weight of the prepolymer and 25 parts by weight of the terpolymer are employed.

The isocyanate prepolymer obtained has the following properties:

NCO content: 3.2%

Viscosity at 100° C.: 17 000 mPa s

Example 4

The procedure follows the conditions of Example 2, amended in that 68 parts by weight of the prepolymer and 32 parts by weight of the terpolymer are employed.

The isocyanate prepolymer obtained has the following properties:

NCO content 2.8%

Viscosity at 100° C.: 55 000 mPa s

Example 5

The procedure follows the conditions of Example 2, amended in that 60 parts by weight of the prepolymer and 40 parts by weight of the terpolymer are employed.

The isocyanate prepolymer obtained has the following properties:

NCO content: 2.4%

Viscosity at 100° C.: 260 000 mPa s

Example 6

Into a reactor maintained under nitrogen atmosphere are introduced 28.5 parts by weight of MDI, 1.5 parts by weight of polyether triol of the polypropylated glycerine type (molecular mass=450; functionality=3; Voranol CP455, marketed by Dow Chemicals) and 5.25 parts by weight of polyether diol of the propylene oxide type (molecular mass= 400; functionality=2; Voranol P400, marketed by Dow Chemicals).

The temperature in the reactor is raised to 60–65° C. and, after the reaction is finished (NCO content of the order of 25%), 25 parts by weight of etheylene/vinyl acetate/hydroxyethyl acrylate terpolymer (65.7% of ethylene, 32% of vinyl acetate, 2.3% of hydroxyethyl acrylate; melt index =460) are introduced, together with 18 parts by weight of polyether diol of the ethylene-propylene copolymer type (molecular mass=3800; functionality=2; Voranol EP1900, marketed by Dow Chemicals) and 21.75 parts by weight of polyether diol of the propylene oxide polymer type (molecular mass=400; functionality=2; Voranol P400, marketed by Dow Chemicals).

The reaction is stopped when the free isocyanate content of the prepolymer is stable.

The isocyanate prepolymer obtained has the following properties:

NCO content: 3.0%

Viscosity at 100° C.: 32 000 mPa s

Example 7 (Comparative)

83 parts by weight of the prepolymer prepared according to Example 1 and 17 parts by weight of a ketonic resin (AP marketed by Hüls) are mixed at 100° C.

The prepolymer obtained has the following properties:

NCO content: 3.5%

Viscosity at 100° C.: 6000 mPa s

Example 8 (Comparative)

Preparation of a polyurethane hot-melt adhesive according to the prior art (Example 1 of EP-B-369 607—Bostik GmbH).

Polymer A1

Into a reactor at 60° C. under nitrogen atmosphere are introduced 800 parts by weight of polyoxypropylene (molecular mass=4000) and 4.5 parts by weight of toluene-sulphonyl isocyanate. 107 parts by weight of MDI are introduced next and the mixture is heated to 110° C. for 2 hours.

The prepolymer A1 has a viscosity at 130° C. of 420 mPa s and an NCO content of 1.9%.

Polymer B

Into a reactor at 40° C. under nitrogen atmosphere containing 351.3 parts by weight of MDI are introduced 4.3 parts by weight of toluenesulphonyl isocyanate and 500 parts by weight of polyoxypropylene (molecular mass=400) and the mixture is heated to approximately 60° C. during one hour and to 120° C. for one hour.

The prepolymer has a viscosity at 130° C. of 18 000 mPa s and an NCO content of 2.25%.

Preperation of the adhesive

One part by weight of the prepolymer A1 and 99 parts by weight of the prepolymer B are mixed at 120–125° C. for one hour.

The mixture obtained is slightly yellow, transparent and liquid at 130° C. and has a viscosity at 130° C. of 18 000 mPa s and an NCO content of 2.20%.

Example 9 (Comparative)

Into a reactor maintained under nitrogen atmosphere are introduced 225 parts by weight of MDI and then, at 80° C., 478 parts by weight of polyester polyol of aliphatic structure (molecular mass=5500; functionality=2), 708 parts by weight of polyester polyol of aliphatic structure (molecular mass=3500; functionality=2) and 47 parts by weight of polycaprolactone polyol (molecular mass=540; functionality=3).

The mass is heated to 90–95° C.

The reaction is stopped when the free isocyanate content of the prepolymer is 2.7%.

The prepolymer obtained is solid at ambient temperature and has a yellow/white colour. At 130° C. this prepolymer is liquid and has a viscosity of 15 000 mPa s.

Example 10

90 parts by weight of the prepolymer according to Example 9 and 10 parts by weight of an ethylene/vinyl acetate/hydroxyethyl acrylate terpolymer (65.7% of ethylene, 32% of vinyl acetate, 2.3% of hydroxyethyl acrylate; melt index=460) are mixed at 100° C.

The isocyanate prepolymer obtained has the following properties:

NCO content: 2.1%

Viscosity at 130° C.: 60 000 mPa s

Example 11

Into a reactor at 90–95° C. maintained under nitrogen atmosphere are introduced 230 parts by weight of MDI, 478 parts by weight of polyester polyol of aliphatic structure (molecular mass=5500; functionality=2), 637.2 parts by weight of polyester polyol of aliphatic structure (molecular mass=3500; functionality=2), 47 parts by weight of polycaprolactone polyol (molecular mass=540; functionality=3) and 194 parts by weight of an ethylene/vinyl acetate/hydroxyethyl acrylate terpolymer (65.7% of ethylene, 32% of vinyl acetate, 2.3% of hydroxyethyl acrylate; melt index=460).

The isocyanate prepolymer obtained has the following properties:

NCO content: 2.4%

Viscosity at 130° C.: 27 000 mPa s

Example 12

The procedure follows the conditions of Example 11, modified in that 531.2 parts by weight of the polyester polyol of molecular mass 3500 and 487 parts by weight of the terpolymer are employed.

The isocyanate prepolymer obtained has the following properties:

NCO content: 2.0%

Viscosity at 130° C.: 110 000 mPa s

Example 13 (Comparative)

Preparation of a polyurethane hot-melt adhesive according to the prior art (Example 1 of EP-A-246 473—National Starch and Chemical Corporation).

Into a reactor under nitrogen atmosphere are introduced 275.8 parts by weight of polypropylene glycol (molecular mass 1000), 88.9 parts by weight of 1,6-hexanediol, neopentyl glycol adipate (molecular mass=3000), 29.3 parts by weight of 1,6-hexanediol, neopentyl glycol adipate (molecular mass=1000), 17.8 parts by weight of butyl methacrylate, 9.4 parts by weight of methyl methacrylate, 0.68 parts by weight of dodecyl mercaptan and 1.7 parts by weight of benzoyl peroxide. The mixture is heated to 80° C. and after 30 minutes 94.1 parts by weight of butyl methacrylate and 53.6 parts by weight of methyl methacrylate are introduced over one hour. After 3 hours at 80° C. 0.6 parts by weight of benzoyl peroxide are introduced. After 2 hours at 80° C. 131.1 parts by weight of MDI are introduced. The reactor is heated to 100° C. for 3 hours and a vacuum of 120–130 mm is applied for 20–30 minutes.

The product obtained has the following properties:

NCO content: 1.5%

Viscosity at 130° C.: 61 000 mPa s

Example 14 (Comparative)

Into a reactor under nitrogen atmosphere are introduced 168 parts by weight of MDI and then, at 80° C., 600 parts by weight of polyester polyol of aromatic/aliphatic structure (molecular mass=3500; functionality=2), 200 parts by weight of polyester polyol of aliphatic structure (molecular mass=3500; functionality=2) and 16 parts by weight of aliphatic polycaprolactone polyol (molecular mass=540; functionality=3).

The mixture is heated to 100–110° C. The reaction is stopped when the free isocyanate content of the prepolymer is 3.4%.

The prepolymer obtained is solid at ambient temperature, translucent and slightly yellow in colour. At 130° C. this prepolymer is liquid and has a viscosity of 16 000 mPa s.

Example 15

80 parts by weight of the prepolymer according to Example 14 and 20 parts by weight of an ethylene/vinyl acetate/hydroxy ethyl acrylate terpolymer (65.7% of ethylene, 32% of vinyl acetate, 2.3% of hydroxyethyl acrylate; melt index=460) are mixed at 100° C.

The isocyanate prepolymer obtained has the following properties:

NCO content: 2.5%

Viscosity at 130° C.: 72 000 mPa s.

Examples 16 to 30

In the examples which follow, the initial cohesion of the abovementioned adhesives is measured according to the method which consists in depositing, at 100 or 130° C., a strand of hot-melt adhesive which has a diameter of the order of 1.5 mm on a test piece of untreated cardboard. A second test piece, identical with the first, is applied immediately and manual pressure is applied to the joint for 5 or 15 seconds (pressure time). The bonded joint thus produced is immediately suspended in a vertical position by its upper end and the lower end is loaded with masses of 150 or 300 g. The time, in seconds (strength time hereinafter), for the assembly to fail is measured.

The results are presented in Table 1 which follows:

The prepolymer thus obtained is heated to 90° C. and 5 parts by weight of ethylene/vinyl acetate/hydroxyethyl acrylate terpolymer are introduced into it (65.7% of ethylene; 32% of vinyl acetate 2.3% of hydroxyethyl acrylate ;.melt index=460).

The isocyanate prepolymer obtained has the following properties:

NCO content=7%

Viscosity at 23° C.=17000 mPa s.

The prepolymer exhibits a high adhesiveness and improved cohesion and flexibility in relation to the same adhesive not containing the terpolymer.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Polyurethane-based single-component hot-melt adhesives comprising the polyaddition product of a polyisocyanate, of a polyol and of a copolymer of ethylene, of vinyl acetate and of an ethylenically unsaturated monomer containing at least one primary hydroxyl group per mole, the polyol is selected from polyether polyols, polyester polyols, unsaturated polyols and mixtures of these compounds, the copolymer includes:

1) 5 to 100 meq. OH of an ethylenically unsaturated monomer containing at least one hydroxyl group per mole,

TABLE 1

| EXAMPLE No. | ADHESIVE ACCORDING TO EXAMPLE No. | TEMPERATURE OF APPLICATION (° C.) | MASS (g) | PRESSURE TIME (s) | STRENGTH TIME (s) |
|---|---|---|---|---|---|
| 16 (Comparative) | 1 | 100 | 150 | 15 | <5 |
| 17 | 2 | 100 | 150 | 15 | 31 |
| 18 | 3 | 100 | 150 | 15 | 90 |
| 19 | 4 | 100 | 150 | 15 | 200 |
| 20 | 5 | 100 | 150 | 15 | >3600 |
| 21 | 6 | 100 | 150 | 15 | 25 |
| 22 (Comparative) | 7 | 100 | 150 | 15 | 50 |
| 23 (Comparative) | 8 | 130 | 150 | 15 | 11 |
| 24 (Comparative) | 9 | 130 | 300 | 5 | 0 |
| 25 | 10 | 130 | 300 | 5 | >3600 |
| 26 | 11 | 130 | 300 | 5 | >3600 |
| 27 | 12 | 130 | 300 | 5 | >3600 |
| 28 (Comparative) | 13 | 130 | 300 | 5 | 155 |
| 29 (Comparative) | 14 | 130 | 1000 | 5 | 25 |
| 30 | 15 | 130 | 1000 | 5 | 300 |

Example 31

Into a reactor maintained under a nitrogen atmosphere are introduced 30 parts by weight of 4,4'-diphenylmethane diisocyanate (MDI), 5 parts by weight of polyether triol of the polypropylated glycerine type (molecular mass=450; functionality=3; Voranol CP455, marketed by Dow Chemicals).

The temperature in the reactor is raised to 60–65° C. and, after the reaction is complete (stable NCO content), 65 parts by weight of polyether diol of the ethylene-propylene copolymer type are introduced (molecular mass=3800; functionality=2; Voranol EP1900, marketed by Dow Chemicals).

The reaction is complete when the free isocyanate content is 7.4%.

2) 60 to 90% by weight of ethylene, 3) 10 to 40% by weight of vinyl acetate, the percentage being calculated relative to the total weight of ethylene and vinyl acetate, and the copolymer has a melt index at 190° C. of between 100 and 1000.

2. Adhesives according to claim 1, wherein the polyisocyanate is selected from aliphatic, cycloaliphatic and aromatic polyisocyanates and mixtures of these compounds.

3. Adhesives according to claim 2, wherein the polyisocyanate is MDI, 2,4'-diphenylmethane diisocyanate, 2,2'-diphenylmethane diisocyanate, TDI, 2,4-toluene diisocyanate, HMDI or IPDI.

4. Adhesives according to claim 1, wherein the copolymer of ethylene, of vinyl acetate and of an ethylenically unsaturated monomer content is between 1 and 49% by weight relative to all constituents.

5. Adhesives according to claim 1, wherein the content of free isocyanate functional groups is between 1 and 25%.

6. Process for the preparation of the adhesives according to claim 1, wherein it is implemented by polyaddition of a polyisocyanate, of a polyol and of a copolymer of ethylene, of vinyl acetate and of an ethylenically unsaturated monomer containing at least one hydroxyl group per mole.

7. Process according to claim 6, wherein it consists in reacting the polyisocyanate and the polyol in a first stage to form a prepolymer which prepolymer reacts in a second stage with the copolymer.

8. Method for the adhesive bonding of materials which are flexible or rigid comprising bonding the materials with adhesive according to claim 1.

9. Method according to claim 8, wherein the material is a flexible film.

10. Polyurethane-based single-component hot-melt adhesives comprising a polyaddition product of a polyisocyanate, of a polyol and of a copolymer of ethylene, of vinyl acetate and of an ethylenically unsaturated monomer containing at least one primary hydroxyl group per mole, the polyisocyanate is MDI, 2,4'-diphenylmethane diisocyanate, 2,2'-diphenylmethane diisocyanate, TDI, 2,4-toluene diisocyanate, HMDI or IPDI, the polyol is selected from polyether polyols, polyester polyols, unsaturated polyols and mixtures of these compounds, the copolymer includes:

1) 5 to 100 meq. OH of an ethylenically unsaturated monomer containing at least one hydroxyl group per mole, 2) 60 to 90% by weight of ethylene, 3) 10 to 40% by weight of vinyl acetate, the percentage being calculated relative to the total weight of ethylene and vinyl acetate, and the copolymer has a melt index at 190° C. of between 100 and 1000.

* * * * *

UNITED STATES PATENT AND TRADEMARK OFFICE
CERTIFICATE OF CORRECTION

PATENT NO. : 5,922,805
DATED       : July 13, 1999
INVENTOR(S): BOUTTEFORT, et al.

It is certified that error appears in the above-identified patent and that said Letters Patent is hereby corrected as shown below:

In column 4, lines 58-59 delete the centered subheading "EXAMPLES"; and
in column 5, after line 27 insert the centered subheading --EXAMPLES--.

Signed and Sealed this

Twenty-fifth Day of April, 2000

Attest:

Q. TODD DICKINSON

*Attesting Officer*            *Director of Patents and Trademarks*